United States Patent
Chen et al.

(10) Patent No.: US 10,215,038 B2
(45) Date of Patent: *Feb. 26, 2019

(54) METHOD AND COMPUTER-READABLE MODEL FOR ADDITIVELY MANUFACTURING DUCTING ARRANGEMENT FOR A GAS TURBINE ENGINE

(71) Applicant: Siemens Energy, Inc., Orlando, FL (US)

(72) Inventors: Yuntao Chen, Oviedo, FL (US); Juan Enrique Portillo Bilbao, Oviedo, FL (US); Andrew J. North, Orlando, FL (US); Lucky Tran, Orlando, FL (US); Joseph Meadows, Charlotte, NC (US); Walter Ray Laster, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 263 days.

This patent is subject to a terminal disclaimer.

(21) Appl. No.: 15/165,210

(22) Filed: May 26, 2016

(65) Prior Publication Data

US 2017/0342846 A1   Nov. 30, 2017

(51) Int. Cl.
*F01D 9/02* (2006.01)
*F02C 7/04* (2006.01)
(Continued)

(52) U.S. Cl.
CPC .............. *F01D 9/023* (2013.01); *F02C 3/14* (2013.01); *F02C 7/04* (2013.01); *F02C 7/222* (2013.01);
(Continued)

(58) Field of Classification Search
CPC ..... B29C 67/0088; B33Y 50/02; F01D 9/023; F02C 7/04; F02C 7/222; F05D 2220/32;
(Continued)

(56) References Cited

U.S. PATENT DOCUMENTS

| | | | | |
|---|---|---|---|---|
| 4,609,328 A | * | 9/1986 | Cirrito | F04F 5/00 417/158 |
| 5,207,054 A | * | 5/1993 | Rodgers | F01D 9/023 60/751 |

(Continued)

*Primary Examiner* — Kenneth M Lo
*Assistant Examiner* — Chad G Erdman

(57) ABSTRACT

Method and computer-readable model for additively manufacturing a ducting arrangement (10) for a gas turbine engine are provided. Ducting arrangement (10) may include a duct (18) to be fluidly coupled to receive a cross-flow of combustion gases from a main combustion stage. Duct (18) includes a duct segment (23) with an expanding cross-sectional area (24) where one or more injector assemblies (26) are disposed. Injector assembly (26) includes one or more reactant-guiding structures (27) arranged to deliver a flow of reactants to be mixed with the cross-flow of combustion gases. The ducting arrangement is effective to reduce total pressure loss while providing an effective level of mixing of the injected reactants with the passing cross-flow. Respective duct components or the entire ducting arrangement may be formed as a unitized structure, such as a single piece using a rapid manufacturing technology, such as 3D Printing/Additive Manufacturing (AM) technologies.

13 Claims, 5 Drawing Sheets

(51) Int. Cl.
  *F02C 7/22* (2006.01)
  *G05B 19/4099* (2006.01)
  *B33Y 50/02* (2015.01)
  *F02C 3/14* (2006.01)
  *B33Y 80/00* (2015.01)

(52) U.S. Cl.
  CPC .......... *G05B 19/4099* (2013.01); *B33Y 80/00* (2014.12); *F05D 2230/50* (2013.01); *F05D 2240/35* (2013.01); *F05D 2260/601* (2013.01); *F05D 2260/81* (2013.01); *G05B 2219/35134* (2013.01); *G05B 2219/49007* (2013.01); *G06F 2217/12* (2013.01)

(58) Field of Classification Search
  CPC ............. F05D 2230/31; F05D 2230/50; F05D 2240/35; G05B 19/4099; G05B 2219/35134; G05B 2219/49007; G06F 2217/12
  See application file for complete search history.

(56) References Cited

U.S. PATENT DOCUMENTS

| | | | | |
|---|---|---|---|---|
| 5,475,979 A | * | 12/1995 | Oag | F23C 6/047 60/737 |
| 5,657,631 A | * | 8/1997 | Androsov | F23D 11/402 239/403 |
| 6,811,744 B2 | | 11/2004 | Keicher et al. | |
| 7,721,547 B2 | | 5/2010 | Bancalari et al. | |
| 8,112,216 B2 | | 2/2012 | Davis, Jr. et al. | |
| 8,276,389 B2 | | 10/2012 | Charron et al. | |
| 8,375,726 B2 | | 2/2013 | Wiebe et al. | |
| 8,752,386 B2 | * | 6/2014 | Fox | F23R 3/286 60/734 |
| 9,188,341 B2 | | 11/2015 | McMasters et al. | |
| 2007/0006595 A1 | * | 1/2007 | Bruck | F23R 3/40 60/777 |
| 2007/0084213 A1 | * | 4/2007 | Burd | F23R 3/50 60/776 |
| 2012/0027578 A1 | * | 2/2012 | Nanda | F04D 29/541 415/211.2 |
| 2014/0007583 A1 | * | 1/2014 | Harding | F23R 3/286 60/776 |
| 2014/0103581 A1 | | 4/2014 | Das et al. | |
| 2014/0199175 A1 | | 7/2014 | Godfrey et al. | |
| 2014/0260296 A1 | * | 9/2014 | Patel | F23R 3/06 60/776 |
| 2015/0285504 A1 | | 10/2015 | Melton | |
| 2015/0322799 A1 | * | 11/2015 | Xu | F01D 5/18 416/231 R |
| 2017/0074521 A1 | * | 3/2017 | Horikawa | F02C 7/232 |

* cited by examiner

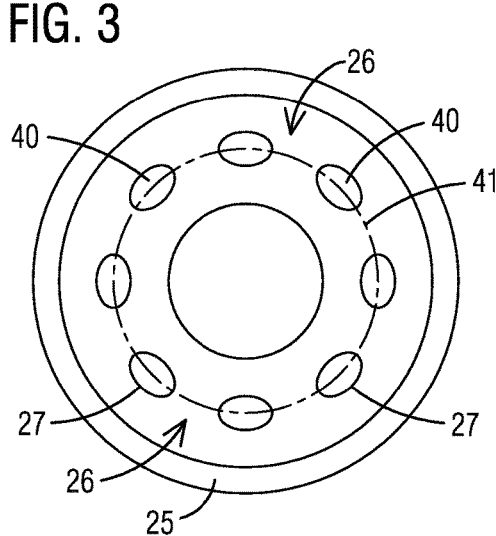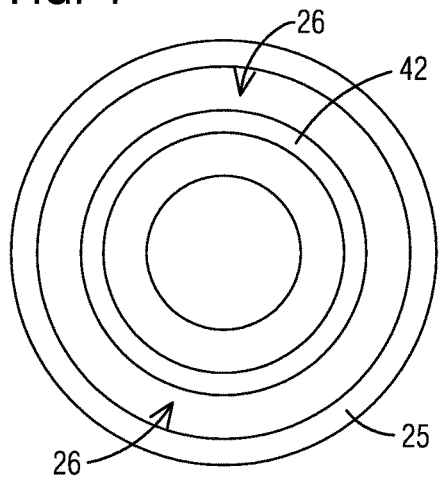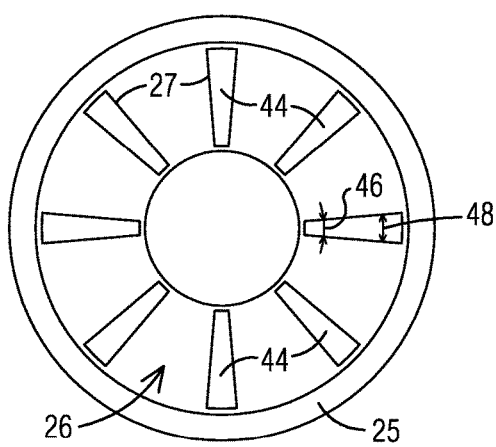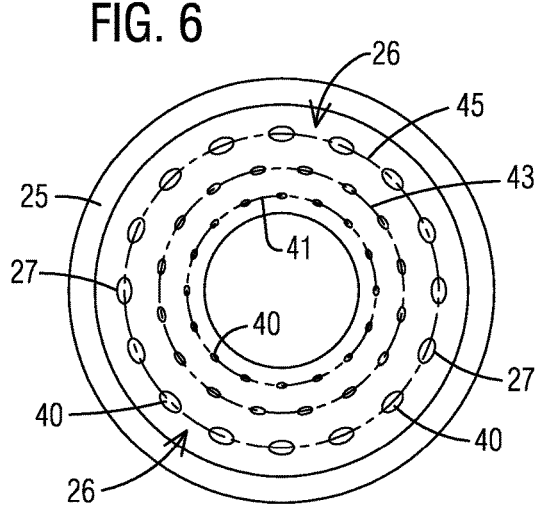

METHOD AND COMPUTER-READABLE MODEL FOR ADDITIVELY MANUFACTURING DUCTING ARRANGEMENT FOR A GAS TURBINE ENGINE

STATEMENT REGARDING FEDERALLY SPONSORED DEVELOPMENT

Development for this invention was supported in part by Contract No. DE-FE0023968, awarded by the United States Department of Energy. Accordingly, the United States Government may have certain rights in this invention.

CROSS-REFERENCE TO RELATED APPLICATIONS

The present application is related to U.S. patent application Ser. No. 15/165,195 titled "Ducting Arrangement with Injector Assemblies Arranged in an Expanding Cross-Sectional Area of a Downstream Combustion Stage in a Gas Turbine Engine", filed concurrently herewith and incorporated by reference in its entirety.

BACKGROUND

1. Field

Disclosed embodiments are generally related to combustion turbine engines, such as gas turbine engines and, more particularly, to a ducting arrangement with injector assemblies arranged in a region with an expanding cross-sectional area downstream of the primary combustion stage in a gas turbine engine.

2. Description of the Related Art

In most large stationary gas turbine engines, fuel is delivered from a fuel source to a combustion section where the fuel is mixed with air and ignited to generate hot combustion products that define working gases. The working gases are directed to a turbine section where they drive the rotation of a turbine rotor. It is known that production of NOx emissions can be reduced by reducing the residence time of the working fluid in the combustion section. One approach to reduce this residence time is to provide and ignite a portion of the fuel and air downstream of the primary combustion stage. This approach is referred to in the art as a distributed combustion system (DCS). See, for example, U.S. Pat. Nos. 8,375,726 and 8,752,386.

It is also known that certain ducting arrangements in a gas turbine engine may be configured to appropriately align the flow of working gases, so that the need of a first stage of flow-directing vanes in the turbine section of the engine can be eliminated. See for example U.S. Pat. Nos. 7,721,547 and 8,276,389. Each of the above-listed patents is herein incorporated by reference.

BRIEF DESCRIPTION OF THE DRAWINGS

FIGS. 3-8 are respective views of various non-limiting embodiments of disclosed arrangements of injector assemblies disposed in the duct segment, as visualized by an observer located downstream relative to such injector assemblies.

DETAILED DESCRIPTION

Figure 1:
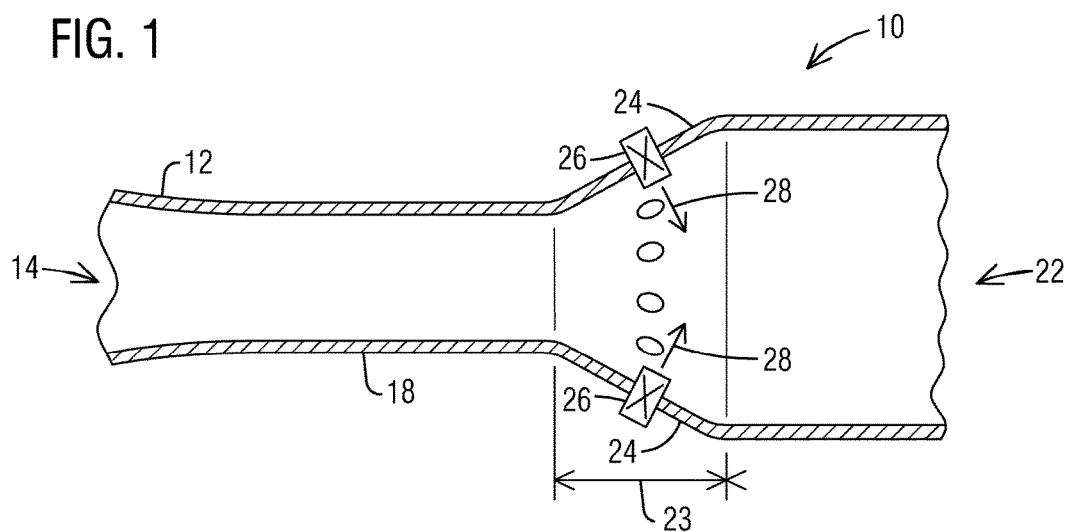
FIG. 1 is a fragmentary schematic of a disclosed ducting arrangement including a duct segment with an expanding cross-sectional area that may be arranged with one or more injector assemblies to inject respective flows of reactants into a downstream combustion stage to be mixed with a cross-flow of combustion gases.

There are certain advantages that can result from the integration of combustor design approaches, such as a distributed combustion system (DCS) approach and an advanced ducting approach, into the combustor system of a combustion turbine engine, such as a gas turbine engine. For example, by injecting reactants (e.g., fuel and air) through a number of injector assemblies (as each may comprise an assembly of an air scoop and a fuel nozzle) disposed in a combustion stage downstream (also referred to in the art as a secondary combustion stage or axial combustion stage) from the main combustion stage, it is contemplated to achieve a decreased static temperature in the main combustion stage and a reduced combustion residence time, each of which is conducive to reduce NOx emissions to be within acceptable levels at turbine inlet temperatures of approximately 1700° C. (3200° F.) and above.

In certain embodiments, this downstream combustion stage may involve a flow-accelerating structure that passes a cross-flow of combustion gases (e.g., vitiated gases from the main combustion stage) that can reach relatively high subsonic speeds, which is conducive to achieve a decreased static temperature and a reduced combustion residence time.

The present inventors have recognized that at the relatively high subsonic speeds of the passing cross-flow of combustion gases, there may be a substantial drop in the total pressure across the downstream combustion stage, which may not be desirable. In view of such recognition, the present inventors propose an innovative ducting arrangement appropriately configured with injector assemblies arranged in a region with expanding cross sectional area in the downstream combustion stage. This is effective to reduce the magnitude of such pressure loss while achieving an effective level of mixing of the injected reactants with the passing cross-flow of combustion gases. Additionally, the ducting arrangement and injector assemblies are appropriately configured to reduce total pressure loss in the downstream combustion stage by reducing perturbations to the speed of the cross-flow.

The present inventors have further recognized that traditional manufacturing techniques may not be conducive to a cost-effective and/or realizable manufacture of injector assembly configurations that may be involved to efficiently implement the foregoing approaches. For example, traditional manufacturing techniques tend to fall short from consistently limiting manufacturing variability; and may also fall short from cost-effectively and reliably producing the relatively complex geometries and miniaturized features and/or conduits that may be involved in such combustor components.

In view of this further recognition, in one non-limiting embodiment, the present inventors further propose use of three-dimensional (3D) Printing/Additive Manufacturing (AM) technologies, such as laser sintering, selective laser melting (SLM), direct metal laser sintering (DMLS), electron beam sintering (EBS), electron beam melting (EBM), etc., that may be conducive to cost-effectively making disclosed injector assemblies that may involve complex geometries and miniaturized features and/or conduits. For readers desirous of general background information in connection with 3D Printing/Additive Manufacturing (AM) technologies, see, for example, a textbook titled "Additive Manufacturing Technologies, 3D Printing, Rapid Prototyping, and Direct Digital Manufacturing", by Gibson I., Stucker B., and Rosen D., 2010, published by Springer, and this textbook is incorporated herein by reference.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

In one non-limiting embodiment, a disclosed ducting arrangement may comprise a unitized ducting arrangement. The term "unitized" in the context of this application, unless otherwise stated, refers to a structure which is formed as a single piece (e.g., monolithic construction) using a rapid manufacturing technology, such as without limitation, 3D Printing/Additive Manufacturing (AM) technologies, where the unitized structure, singly or in combination with other unitized structures, can form a component of the combustion turbine engine, such as for example respective injector assemblies, or an entire ducting arrangement including such assemblies.

FIG. 1 is a fragmentary schematic of a ducting arrangement 10 in a combustion stage (e.g., a downstream combustion stage) of a combustion turbine engine, such as a gas turbine engine. In one non-limiting embodiment, ducting arrangement 10 may include a flow-accelerating structure 12, such as a conical structure, fluidly coupled to receive at an inlet side 14 of ducting arrangement 10 a cross-flow of combustion gases, such as from a traditional combustor outlet (not shown) conveying combustion gases from the main combustion stage. The flow of combustion gases may be accelerated by flow-accelerating structure 12 to a relatively high subsonic Mach (Ma) number, such as without limitation may comprise a range from approximately 0.3 Ma to approximately 0.8 Ma.

It will be appreciated that disclosed ducting arrangements need not be limited to applications involving such a flow-accelerating structure since any application involving a cross-flow comprising a relatively high subsonic Ma number can benefit from disclosed ducting arrangements.

Figure 2:
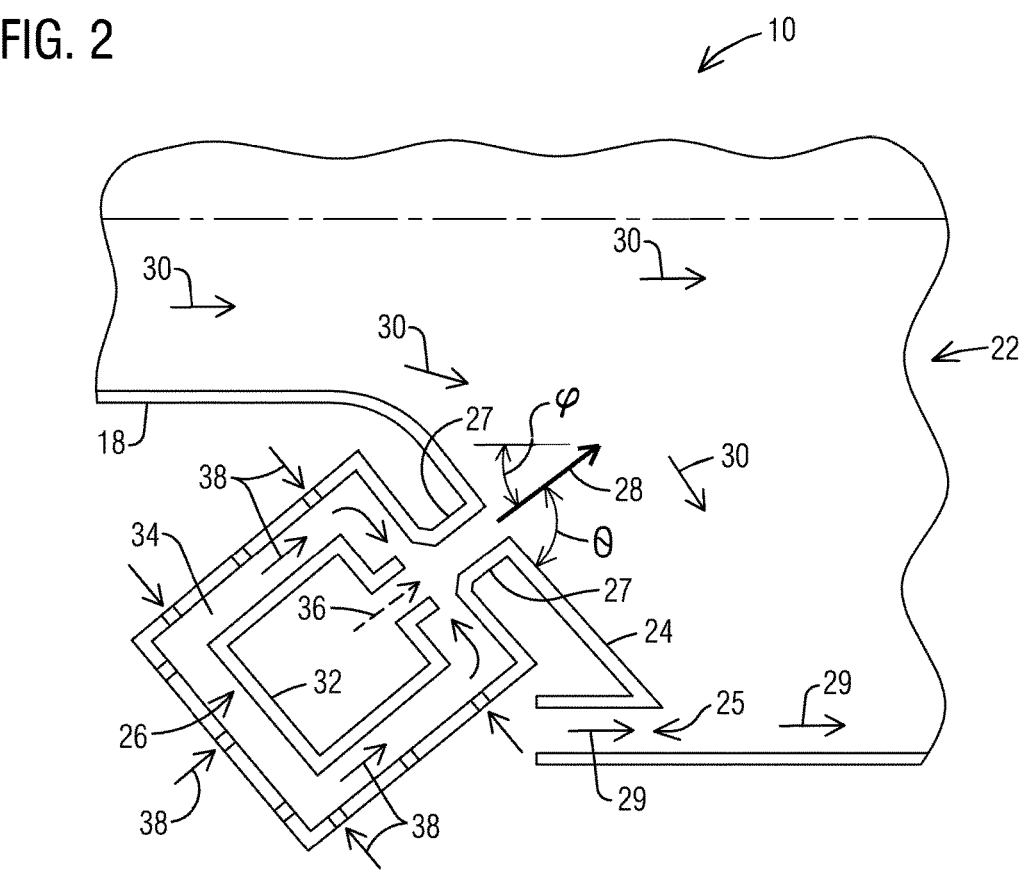
FIG. 2 is a fragmentary schematic illustrating certain structural details in connection with a disclosed duct and an injector assembly disposed in the duct segment.

Ducting arrangement 10 includes a duct 18 in connection with the downstream combustion stage. Duct 18 may be fluidly coupled to receive the cross-flow of combustion gases from flow-accelerating structure 12. In disclosed embodiments, duct 18 comprises a duct segment 23 including an expanding cross-sectional area 24 as the cross-flow of combustion gases travels toward a turbine section (not shown) of the gas turbine engine. Combustion gases from the main and the downstream combustion stages travel toward an outlet side 22 of ducting arrangement 10 to be conveyed toward the turbine section of the gas turbine engine via further components not germane relative to disclosed embodiments. FIG. 2 is a fragmentary schematic illustrating certain structural details in connection with the downstream combustion duct (i.e., duct 18) and one non-limiting embodiment of injector assembly 26 disposed in duct segment 23 (FIG. 1) of duct 18. Disclosed embodiments, further include one or more injector assemblies 26 disposed in duct segment 23. Injector assembly 26 may include a reactant-guiding structure 27 (FIG. 2) arranged to inject a flow of reactants (schematically represented by arrow 28) into the downstream combustion stage to be mixed with the cross-flow of combustion gases.

By injecting reactants at locations of the downstream combustion stage having such an expanding cross-sectional area, one effectively reduces flow-constriction to the cross-flow of combustion gases (schematically represented by arrows 30 in FIG. 2), which in turn is effective to reduce losses in total pressure that otherwise would develop across the downstream combustion stage.

In one non-limiting embodiment, ducting arrangement 10 includes a fuel manifold 32 and an air plenum 34 arranged to convey pressurized air from a suitable supply (not shown). Fuel manifold 32 and air plenum 34 is each respectively fluidly coupled to supply the reactants (e.g., fuel (schematically represented by arrow 36) and air (schematically represented by arrows 38)) to reactant-guiding structure 27.

In one non-limiting embodiment, reactant-guiding structure 27 may be configured to achieve a desired injection angle of flow of reactants 28 relative to the cross-flow of combustion gases (schematically represented by angle $\Phi$ in FIG. 2). In one non-limiting embodiment, the desired injection angle $\Phi$ of the flow of reactants relative to the cross-flow of combustion gases may be in a range from approximately 10° to approximately 80°. It will be appreciated that the desired injection angle of the flow of reactants relative to the cross-flow of combustion gases can influence both total pressure loss and jet penetration in the downstream combustion stage. Therefore, an optimum injection angle may be appropriately chosen depending on the needs of a give application, such as cross-flow conditions, etc.

It will be appreciated that the injection angle of the flow of reactants may be alternatively characterized relative to the wall of duct segment 23 having the expanding cross-sectional area 24 through which the cross-flow passes. In this frame of reference, the injection may potentially have a range from approximately 10° to approximately 170°, as schematically represented by angle θ in FIG. 2, so long as the wall geometry (e.g., wall slope, etc.) in a given duct design permits meeting the foregoing range for angle Φ.

In one non-limiting embodiment, duct segment 23 may include a circumferentially-extending passageway 25 arranged to convey further pressurized air. In one non-limiting embodiment, passageway 25 is located along a downstream periphery of duct segment 23 to inject a peripheral stream of air (schematically represented by arrows 29) downstream from injector assembly 26. This peripheral stream of air is effective to form a film of cooling air along an inner surface of a wall portion of duct 18, which is downstream of expanding cross-sectional area 24. Additionally, such a peripheral stream of air may be effective to dilute reactants inside one or more recirculation zones that may form in the downstream combustion stage. This dilution is conducive to reduce local temperatures and NOx formation.

In one non-limiting embodiment, duct segment 23 (FIG. 1) may define a circular cross section. In this embodiment, injector assembly may comprise a plurality of circumferentially arranged reactant-guiding structures 27 in duct segment 23.

As may be appreciated in the view shown in FIG. 3, as visualized by an observer located downstream relative to injector assembly 26, in one non-limiting embodiment, the circumferentially arranged reactant-guiding structures 27 may form a circular row (schematically represented by line 41) of spaced-apart reactant-guiding structures 27 each including a respective injection orifice 40.

Figure 10:
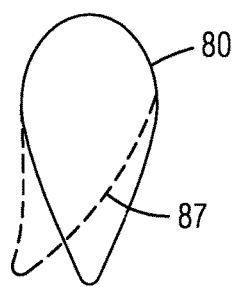
FIGS. 10-16 are respective views of various non-limiting embodiments of cross-sectional profiles that may be used in connection with injection orifices defined by reactant-guiding structures of the injector assemblies.
Figure 11:
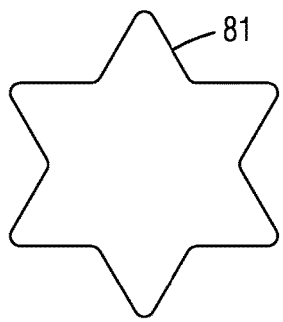
Figure 12:
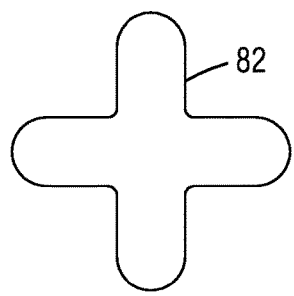
Figure 13:
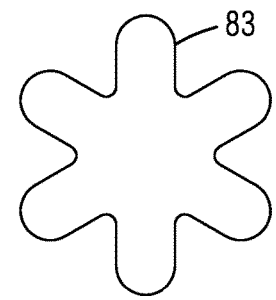
Figure 14:
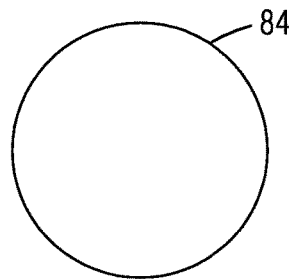
Figure 15:
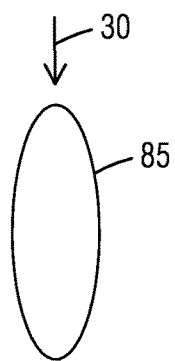
Figure 16:
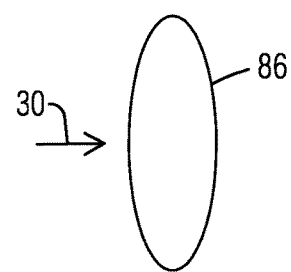

FIGS. 10-16 are respective views of various non-limiting embodiments of cross-sectional profiles that may be used in connection with injection orifices 40 in the reactant-guiding structures 27 of injector assembly 26. FIG. 10 shows an airfoil shaped cross-sectional profile 80. This profile could include a camber 87 depending on the needs of a given application. FIG. 11 shows a star-shaped cross-sectional profile 81. FIG. 12 shows a cross-shaped cross-sectional profile 82. FIG. 13 shows a multi-lobe cross-sectional profile 83. FIG. 14 shows a circular cross-sectional profile 84. FIG. 15 shows a slotted (e.g., oblong shape) cross-sectional profile 85 having its major axis aligned parallel relative to the direction of the cross-flow 30, whereas FIG. 16 shows a similar cross-sectional profile 86 (e.g., slotted or oblong shape) having its major axis perpendicular relative to the direction of the cross-30. It will be appreciated that aspects of disclosed embodiments are not limited to the foregoing cross-sectional profiles since other cross-sectional profiles may be used equally effectively depending on the needs of a given application.

As shown in the view depicted in FIG. 4, as visualized by an observer located downstream relative to injector assembly 26, in one non-limiting embodiment, injector assembly 26 may comprise a circumferentially-extending reactant-guiding structure 42 configured to provide annular injection in duct segment 23.

As shown in the view depicted in FIG. 5, as visualized by an observer located downstream relative to injector assembly 26, in one non-limiting embodiment, the circumferentially arranged reactant-guiding structures 27 comprises a plurality of spaced-apart reactant-guiding structures, each forming a respective radially-extending slot 44.

In one non-limiting embodiment, each respective radially-extending slot 44 has an increasing width as the slot extends from a radially inward location to a radially outwardly location, as schematically represented by respective twin-headed arrows 46 and 48. This embodiment has the additional benefit of effectively distributing the reactants injected into the downstream combustion stage throughout the entirety of the volumetric expansion of the downstream combustion stage so that the bulk cross flow velocity profile throughout this region can be made substantially constant.

As seen in the view depicted in FIG. 6, as visualized by an observer located downstream relative to injector assembly 26, the injector assembly may comprise a plurality of concentric circular rows (schematically represented by rows 41, 43, 45) of spaced-apart reactant-guiding structures arranged at different axial locations in duct segment 23, and where each reactant-guiding structure includes a respective injection orifice 40.

In one non-limiting embodiment, respective injection orifices at a first row (e.g., row 45) of the plurality of concentric circular rows may comprise an injection area that is larger in size relative to the injection area of respective injection orifices located in rows of the plurality of concentric circular rows located upstream (e.g., rows 43, 41) relative to the first row 45 of respective injection orifices. It will be appreciated that row 45 comprises a row located farthest radially outward relative to the respective radial locations of upstream rows 43, 41. Similarly, injection orifices located within row 43 comprise a larger injection area relative to the injection area of injection orifices located within row 41, since row 43 is in a row located farther radially outward relative to row 41.

Alternatively, the respective injection orifices may be designed to have a substantially constant injection area (e.g., same size for the injection orifices) and in this case the injection orifices at first row 45 of the plurality of concentric circular rows may comprise a larger number of injection orifices relative to the number of injection orifices located in rows 43, 41 of the plurality of concentric circular rows located upstream relative to first row 45. In this arrangement, similar to the embodiment shown in FIG. 5, reactants are evenly introduced throughout the expansion section of duct 18, such that the perturbation to the cross-flow velocity is minimized.

Figure 7:
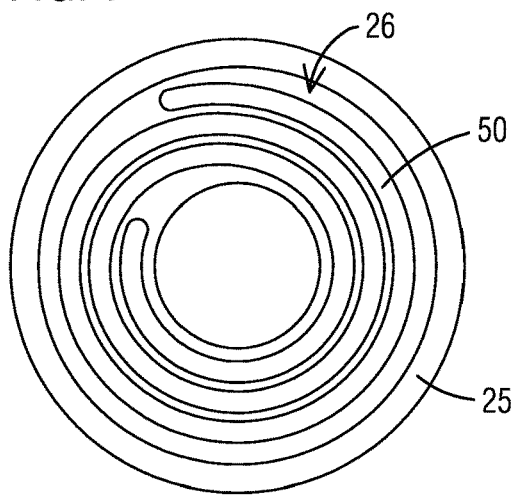

As shown in the view depicted in FIG. 7, as visualized by an observer located downstream relative to injector assembly 26, in one non-limiting embodiment, the injector assembly comprises a spirally-extending reactant-guiding structure 50 in duct segment 23.

Figure 8:
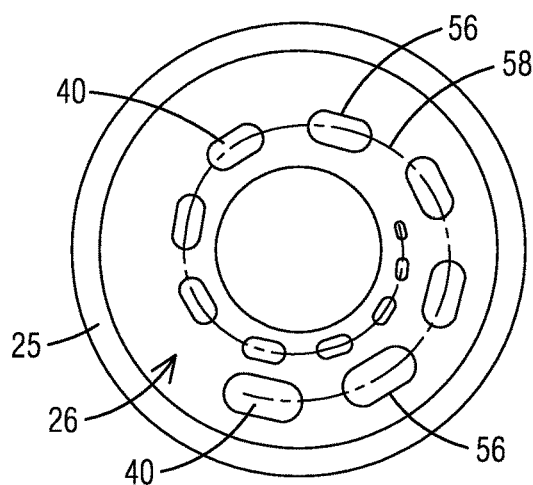

As shown in the view depicted in FIG. 8, as visualized by an observer located downstream relative to injector assembly 26, in one non-limiting embodiment, the injector assembly may comprise a plurality of spaced apart reactant-guiding structures 56 arranged along a spiral path (schematically represented by line 58) in duct segment 23. Each reactant-guiding structure including a respective injection orifice 40, and in one non-limiting embodiment, the injection orifices 40 of the spaced apart reactant-guiding structure may comprise a relatively larger injection area as the spiral path extends from a radially inward location to a radially outward location. Alternatively, the respective spacing between adjacent injection orifices 40 may be kept relatively constant, while maintaining equivalent injection areas, (e.g., same size for the injection orifices).

A motivation behind adjusting the size of the injection area and/or the number of injection orifices depending on radial positioning (as noted in preceding embodiments) is to provide radial mass flow adjustment to the reactants being injected into the downstream combustion stage so that the amount of mass flow of such reactants remains within a desired range notwithstanding the radial location of the injector assemblies in the expanding cross-sectional area 24 of duct segment 23. In operation, the mass addition of reactants into the downstream combustion stage is ratiometrically reduced at practically the same rate while progressing downstream in duct segment 23. That is, the mass flow is adjusted along the radial direction such that it is relatively larger at the radially outward locations. In this way, one can maintain a relatively uniform mass flux (mass flow rate per area) in the expanding section of the duct.

Figure 9:
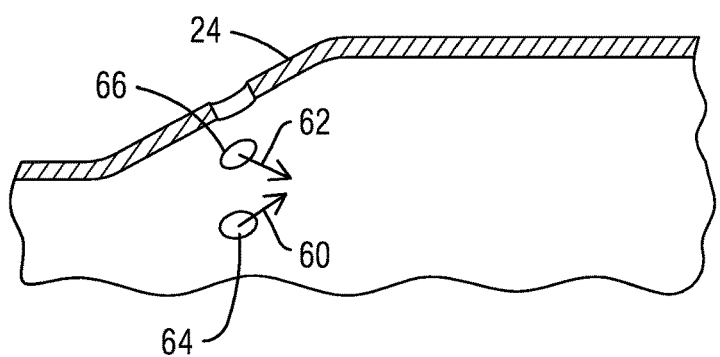
FIG. 9 is a schematic showing one non-limiting arrangement of a respective flow of reactants between two neighboring injector assemblies in the duct segment.

FIG. 9 is a schematic showing one non-limiting arrangement of a respective flow of reactants 60, 62 between two neighboring injector assemblies 64, 66 in the expanding cross-sectional area 24 of duct segment 23. In this example, the flow of reactants 60, 62 may be arranged to converge toward one another, which may be conducive to promote intermixing of the flow of reactants 60, 62 with the cross-flow. This enhanced cross-flow mixing is conducive to reducing peak flame temperatures in the downstream combustion stage which then in turn reduces NOx emissions.

In operation, disclosed injector assemblies can be configured to reduce total pressure loss while injecting a flow of reactants into a passing cross-flow of combustion gases and achieving an effective level of mixing of the injected reactants with the passing cross-flow of combustion gases. This may be achieved without affecting the relatively high subsonic speed of the cross-flow of combustion gases passing through the downstream combustion stage of the gas turbine engine.

In operation, disclosed embodiments are expected to be conducive to realizing a combustion system capable of achieving approximately a 65% combined cycle efficiency or greater in a gas turbine engine. Disclosed embodiments are also expected to realize a combustion system capable of maintaining stable operation at turbine inlet temperatures of approximately 1700° C. and higher while maintaining a relatively low level of NOx emissions, and acceptable temperatures in components of the engine without an increase in cooling air consumption.

Figure 17:
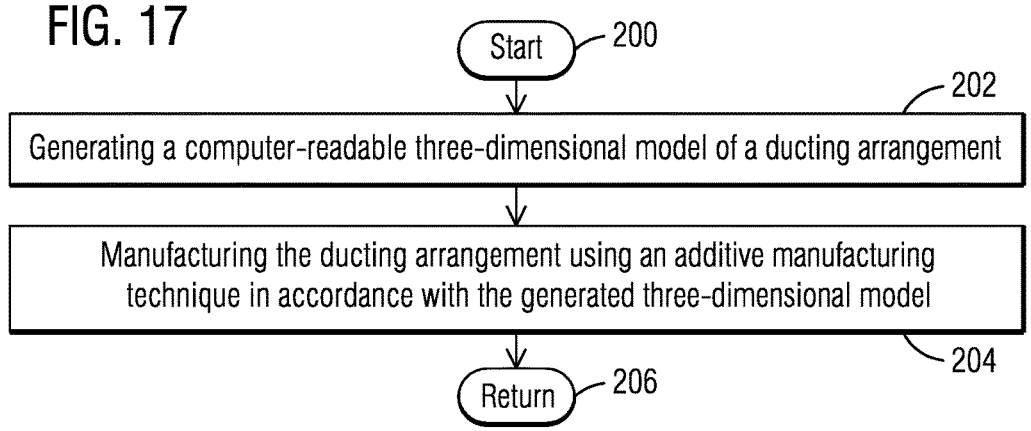
FIG. 17 is a flow chart listing certain steps that may be used in a method for manufacturing disclosed ducting arrangements.

FIG. 17 is a flow chart listing certain steps that may be used in a method for manufacturing disclosed ducting arrangements in a combustion system for a gas turbine engine. As shown in FIG. 17, after a start step 200, step 202 allows generating a computer-readable three-dimensional (3D) model, such as a computer aided design (CAD) model, of a ducting arrangement. The model defines a digital representation of the ducting arrangement, as described above in the context of the preceding figures.

Prior to return step 206, step 204 allows manufacturing the ducting arrangement using an additive manufacturing technique in accordance with the generated three-dimensional model. Non-limiting examples of additive manufacturing techniques may include laser sintering, selective laser melting (SLM), direct metal laser sintering (DMLS), electron beam sintering (EBS), electron beam melting (EBM), etc. It will be appreciated that once a model has been generated, or otherwise available (e.g., loaded into a 3D digital printer, or loaded into a processor that controls the additive manufacturing technique), then manufacturing step 204 need not be preceded by a generating step 202. It will be further appreciated that the entire ducting arrangement or one or more components of the ducting arrangement, e.g., duct, respective injector assemblies, fuel manifold, air plenum, etc., may be formed as respective unitized structures using additive manufacturing in accordance with the generated three-dimensional model.

Figure 18:
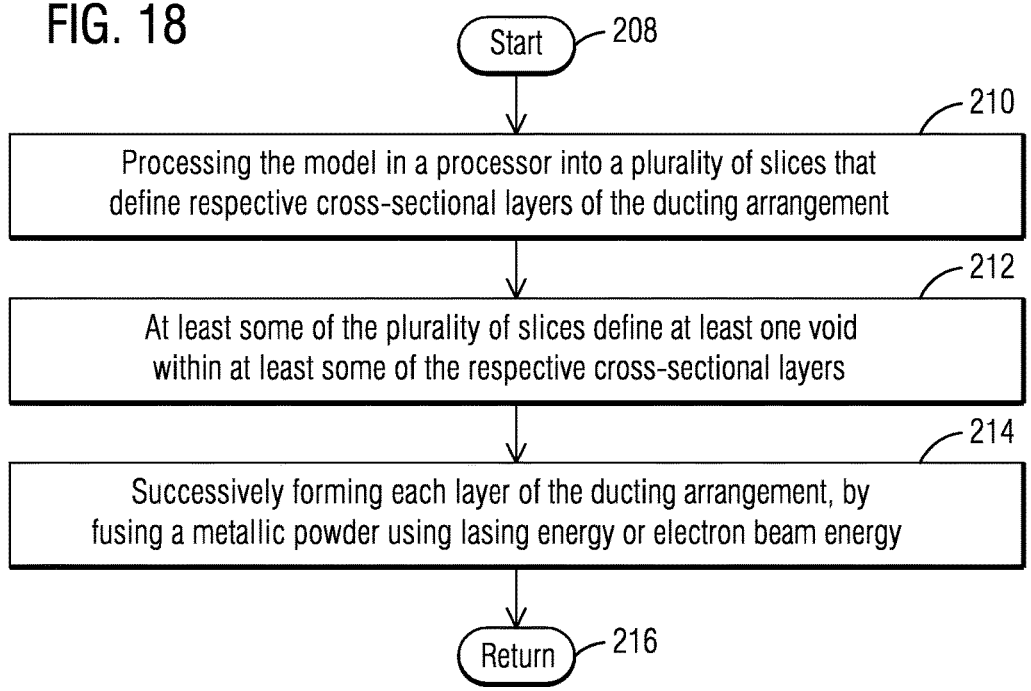
FIG. 18 is a flow chart listing further steps that may be used in the method for manufacturing disclosed ducting arrangements.

FIG. 18 is a flow chart listing further steps that may be used in the disclosed method for manufacturing the ducting arrangement. In one non-limiting embodiment, manufacturing step 204 (FIG. 14) may include the following: after a start step 208, step 210 allows processing the model in a processor into a plurality of slices of data that define respective cross-sectional layers of the ducting arrangement. As described in step 212, at least some of the plurality of slices define one or more voids (e.g., respective voids that may be used to form hollow portions of ducting arrangement 10, such as the flow path for cross-flow 30 (FIG. 2), the conduits and injection orifices in connection with injection assemblies 26, passageway 25, etc.) within at least some of the respective cross-sectional layers of the ducting arrangement. Prior to return step 216, step 214 allows successively forming each layer of the ducting arrangement by fusing a metallic powder using a suitable source of energy, such as without limitation, lasing energy or electron beam energy.

Figure 19:
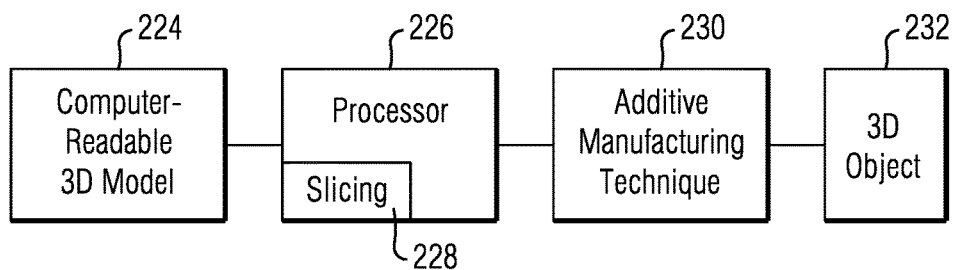
FIG. 19 is a flow sequence in connection with the method for manufacturing disclosed ducting arrangements.

FIG. 19 is a flow sequence in connection with a disclosed method for manufacturing a 3D object 232, such as ducting arrangement 10. A computer-readable three-dimensional (3D) model 224, such as a computer aided design (CAD) model, of the 3D object may be processed in a processor 226, where a slicing module 228 converts model 224 into a plurality of slice files (e.g., 2D data files) that defines respective cross-sectional layers of the 3D object. Processor 226 may be configured to control an additive manufacturing technique 230 used to make 3D object 232.

While embodiments of the present disclosure have been disclosed in exemplary forms, it will be apparent to those skilled in the art that many modifications, additions and deletions can be made therein without departing from the spirit and scope of the invention and its equivalents, as set forth in the following claims.

What is claimed is:

1. A method for manufacturing a ducting arrangement for a combustion stage downstream of a main combustion stage of a gas turbine engine, the method comprising:
   generating a computer-readable three-dimensional (3D) model of the ducting arrangement, the model defining a digital representation comprising:
   a flow-accelerating structure defining a flow-accelerating cone between an inlet of the flow-accelerating structure and an outlet of the flow-accelerating structure, the inlet to be fluidly coupled to receive a cross-flow of combustion gases from the main combustion stage, wherein a circular cross-sectional profile of the flow-accelerating cone narrows in diameter from the inlet towards the outlet a duct to be fluidly coupled to receive a cross-flow of combustion gases from the flow-accelerating structure, wherein the duct comprises a duct segment comprising an expanding cross-sectional area as the cross-flow of combustion gases travels toward a turbine section of the gas turbine engine, wherein the duct segment defined by the model comprises a circular cross-sectional area; and an injector assembly disposed in the duct segment, wherein said injector assembly comprises a plurality of circumferentially arranged reactant-guiding structures disposed about the duct segment, each circumferentially arranged reactant-guiding structures arranged to deliver a flow of reactants along an axis of an injection orifice, the axis of the injection orifice disposed at an injection angle with respect to the cross-flow of combustion gases, and into the downstream combustion stage to be mixed with the cross-flow of combustion gases;

wherein the injector assembly comprises a fuel manifold and an air plenum, the fuel manifold being disposed within the air plenum, wherein the plurality of circumferentially arranged reactant-guiding structures are to be connected to, and between, the duct segment and a wall of the air plenum, wherein the injector assembly is configured to mix fuel from the fuel manifold and air from the air plenum to generate flows of reactants to be delivered by the plurality of circumferentially arranged reactant-guiding structures, wherein an outlet of the fuel manifold is adapted to deliver fuel into the injector assembly in a direction substantially aligned with a respective axis of an injection orifice of a respective circumferentially arranged reactant-guiding structure: and wherein the duct segment includes a circumferentially-extending passageway located along a downstream periphery of the duct segment to inject a peripheral stream of air downstream from the injector assembly; and manufacturing the ducting arrangement using an additive manufacturing technique in accordance with the generated three-dimensional model.

2. The method of claim 1, wherein the injection angle in the range from 10° to approximately 80°.

3. The method of claim 1, wherein the plurality of circumferentially arranged reactant-guiding structures defined by the model are disposed in a circular row.

4. The method of claim 1, wherein the plurality of circumferentially arranged reactant-guiding structures defined by the model comprises a plurality of spaced-apart reactant-guiding structures, each reactant-guiding structure forming a respective radially-extending slot.

5. The method of claim 4, wherein each respective radially-extending slot defined by the model has an increasing width as the slot extends from a radially inward location to a radially outward location.

6. The method of claim 1, wherein the plurality of circumferentially arranged reactant-guiding structures defined by the model are arranged in a plurality of concentric circular rows, each concentric circular row arranged at different axial locations in the duct segment.

7. The method of claim 6, wherein respective injection orifices of circumferentially arranged reactant-guiding structures defined by the model at a first row of the plurality of concentric circular rows comprise respective injection areas that are larger in size relative to respective injection areas of respective injection orifices of circumferentially arranged reactant-guiding structures located in rows of the plurality of concentric circular rows located upstream from the first row.

8. The method of claim 6, further comprising a larger number of respective injection orifices of circumferentially arranged reactant-guiding structures defined by the model in a first row of the plurality of concentric circular rows than a number of respective injection orifices of circumferentially arranged reactant-guiding structures located in rows of the plurality of concentric circular rows located upstream relative to the first row.

9. The method of claim 1, wherein the plurality of circumferentially arranged reactant-guiding structures defined by the model is arranged along a spiral path in the duct segment, wherein respective injection orifices of the circumferentially arranged reactant-guiding structures comprise relatively larger injection areas as the spiral path extends from a radially inward location to a radially outward location.

10. The method of claim 1, wherein the of circumferentially arranged reactant-guiding structures defined by the model is arranged along a spiral path in the duct segment, wherein respective injection orifices of the circumferentially arranged reactant-guiding structures comprise substantially constant injection areas, and wherein a spacing between the circumferentially arranged reactant-guiding structures comprises substantially uniform spacing as the spiral path extends from a radially inward location to a radially outward location.

11. The method of claim 3, wherein the injection orifices of the plurality of circumferentially arranged reactant-guiding structures defined by the model each comprise a cross-sectional profile selected from the group consisting of a circular cross-sectional profile, a non-circular cross-sectional profile, a star-shaped cross-sectional profile, a cross-shaped cross-sectional profile, a multi-lobe cross-sectional profile, an airfoil shaped cross-sectional profile, and a slotted cross-sectional profile having a major axis of the slotted cross-sectional profile aligned parallel or perpendicular relative to a direction of the cross-flow.

12. A non-transitory computer-readable three-dimensional model of a ducting arrangement for a combustion stage downstream of a main combustion stage of a gas turbine engine, wherein the model of the ducting arrangement is processable in a processor configured to control an additive manufacturing technique used to make ducting arrangements, the ducting arrangement comprising:

a duct to be fluidly coupled to receive a cross-flow of combustion gases from a flow-accelerating structure to be fluidly coupled to receive the cross-flow of combustion gases from the main combustion stage, wherein the duct comprises a duct segment comprising an expanding cross-sectional profile, wherein a cross-sectional area of the expanding cross-sectional profile expands in a direction toward a turbine section of the gas turbine engine;

an injector assembly disposed in the duct segment, wherein said injector assembly comprises a plurality of circumferentially arranged reactant-guiding structures disposed about the duct segment, circumferentially arranged reactant-guiding structure arranged to deliver a flow of reactants along an axis of an injection orifice, the axis of the injection orifice disposed at an injection angle with respect to the cross-flow of combustion gases, into the downstream combustion stage to be mixed with the cross-flow of combustion gases wherein the expanding cross-sectional profile in the duct segment and the plurality of circumferentially arranged reactant-guiding structures are arranged to reduce total pressure loss in the downstream combustion stage of the gas turbine engine without substantially affecting a subsonic speed of the cross-flow of combustion gases passing through the downstream combustion stage of the gas turbine engine; and wherein the injector assembly comprises a fuel manifold and an air plenum, the fuel manifold being disposed within the air plenum, wherein the plurality of circumferentially arranged reactant-guiding structures are to be connected to, and between, the duct segment and a wall of the air plenum wherein the injector assembly is configured to mix fuel from the fuel manifold and air from the air plenum to generate flows of reactants to be delivered by the plurality of circumferentially arranged reactant-guiding structures, wherein an outlet of the fuel manifold is adapted to deliver fuel into the injector assembly in a direction substantially aligned with a respective axis of an injection orifice of a respective circumferentially arranged reactant-guiding structure; and wherein the duct segment includes a circumferentially-extending passageway located along a downstream periphery of the duct segment to inject a peripheral stream of air downstream from the injector assembly: and wherein at least one of the duct, the plurality of reactant-guiding structures, the fuel manifold and the air plenum comprises a unitized structure.

13. The computer-readable model of claim 12, wherein the computer-readable model is a computer aided design (CAD) model.

* * * * *